United States Patent
Brindze et al.

[11] Patent Number: 5,822,291
[45] Date of Patent: Oct. 13, 1998

[54] MASS STORAGE ELEMENT AND DRIVE UNIT THEREFOR

[75] Inventors: Paul L. Brindze, Marina del Rey; Geoffrey A. Tully, Los Angeles, both of Calif.

[73] Assignee: Zoom Television, Inc., Los Angeles, Calif.

[21] Appl. No.: 590,268

[22] Filed: Nov. 21, 1995

Related U.S. Application Data

[63] Continuation-in-part of Ser. No. 410,132, Mar. 23, 1995.

[51] Int. Cl.$^6$ .................................................. G11B 13/00
[52] U.S. Cl. ........................... 369/94; 369/14; 369/275.1; 380/4
[58] Field of Search ............................. 369/14, 94, 275.1

[56] References Cited

U.S. PATENT DOCUMENTS

| | | |
|---|---|---|
| 4,163,255 | 7/1979 | Pires . |
| 4,292,650 | 9/1981 | Hendrickson . |

(List continued on next page.)

FOREIGN PATENT DOCUMENTS

| | | | |
|---|---|---|---|
| 0329122 | 2/1989 | European Pat. Off. | G11B 7/00 |
| 0561685 | 9/1993 | European Pat. Off. | G06F 12/14 |
| 0593305 | 10/1993 | European Pat. Off. | G11B 23/28 |
| 3803982 | 2/1988 | Germany | G11B 23/30 |
| 4308680 | 3/1993 | Germany | G11B 23/28 |
| 4403171 | 2/1994 | Germany | G11B 23/28 |
| 9101358 | 8/1991 | Netherlands | G11B 7/24 |
| 2020869 | 11/1979 | United Kingdom . | |
| 2136175 | 9/1984 | United Kingdom . | |
| 8201273 | 4/1982 | WIPO | G11B 23/28 |
| 8304154 | 11/1983 | WIPO . | |
| 8502310 | 5/1985 | WIPO . | |
| 8503584 | 8/1985 | WIPO . | |
| 8802960 | 4/1988 | WIPO | H04L 9/00 |
| 9301550 | 1/1993 | WIPO | G06F 11/34 |
| 9407204 | 3/1994 | WIPO | G06F 15/21 |
| 9501596 | 6/1994 | WIPO | G06F 1/00 |
| 9508231 | 3/1995 | WIPO | H04K 1/00 |

OTHER PUBLICATIONS

"A complete solution for bringing video onto the motherboard" brochure; Philips Semiconductors, USA; 6 pp.; 1994.
"iPower™ Technology—The future is secure" brochure; National Semiconductor, Santa Clara, CA; 12 pp.; no date.
"National iPower™ Data Security Cards" brochure; National Semiconductor, Sunnyvale, CA; 18 pp.; 1994.

(List continued on next page.)

*Primary Examiner*—Thomas H. Tarcza
*Assistant Examiner*—Pinchos M. Laufer
*Attorney, Agent, or Firm*—Sheldon & Mak

[57] ABSTRACT

A mass storage drive removably supports a mass storage element and includes a data head having an output for reading tracks of main data elements. The data head, which can be an optical head, is movable in a predetermined auxiliary path relative to the substrate for scanning a unique machine-readable serial identifier in auxiliary data containing at least 200 bits of information in one or more tracks being exclusive of main data tracks. The mass storage drive includes a head circuit connected to the data head output and having a main amplifier with an output for signaling main data elements in response to the data head, the circuit having a separate auxiliary put for signaling the auxiliary data elements in response to the data head output. The head circuit can include an auxiliary amplifier for driving the auxiliary output. The main amplifier can include a first frequency response effective for passing the main data elements, and the auxiliary amplifier can have a second frequency response for passing the auxiliary data elements while effectively blocking the main data elements. The main amplifier can have a first reference connection for balancing the main output relative to a data threshold, the auxiliary amplifier having a second reference connection effective for balancing the auxiliary output relative to a serial code threshold of the data head when the data head is reading auxiliary data elements.

25 Claims, 6 Drawing Sheets

U.S. PATENT DOCUMENTS

| | | |
|---|---|---|
| 4,325,078 | 4/1982 | Seaton et al. . |
| 4,367,402 | 1/1983 | Giraud et al. . |
| 4,405,829 | 9/1983 | Rivest et al. . |
| 4,433,207 | 2/1984 | Best . |
| 4,458,315 | 7/1984 | Uchenick . |
| 4,595,950 | 6/1986 | Löfberg . |
| 4,646,234 | 2/1987 | Tolman et al. . |
| 4,677,434 | 6/1987 | Fascenda . |
| 4,677,604 | 6/1987 | Selby, III et al. . |
| 4,680,731 | 7/1987 | Izumi et al. . |
| 4,685,055 | 8/1987 | Thomas ........................................ 380/4 |
| 4,688,169 | 8/1987 | Joshi . |
| 4,732,410 | 3/1988 | Holbein et al. . |
| 4,757,534 | 7/1988 | Matyas et al. . |
| 4,766,026 | 8/1988 | Lass et al. . |
| 4,785,361 | 11/1988 | Brotby . |
| 4,791,565 | 12/1988 | Dunham et al. . |
| 4,872,151 | 10/1989 | Smith . |
| 4,891,504 | 1/1990 | Gupta . |
| 4,937,863 | 6/1990 | Robert et al. . |
| 4,961,077 | 10/1990 | Wilson et al. . |
| 5,010,571 | 4/1991 | Katznelson . |
| 5,050,213 | 9/1991 | Shear . |
| 5,103,081 | 4/1992 | Fisher et al. . |
| 5,148,534 | 9/1992 | Comerford . |
| 5,172,413 | 12/1992 | Bradley et al. . |
| 5,210,672 | 5/1993 | Ivers et al. ............................... 360/135 |
| 5,239,165 | 8/1993 | Novak . |
| 5,239,487 | 8/1993 | Horejsi et al. . |
| 5,282,187 | 1/1994 | Lee . |
| 5,371,792 | 12/1994 | Asai et al. . |
| 5,375,206 | 12/1994 | Hunter et al. ........................... 395/712 |
| 5,379,343 | 1/1995 | Grube et al. . |
| 5,398,285 | 3/1995 | Borgelt et al. . |
| 5,400,319 | 3/1995 | Fite et al. . |
| 5,418,852 | 5/1995 | Itami et al. ................................ 380/4 |
| 5,440,631 | 8/1995 | Akiyama et al. . |
| 5,444,779 | 8/1995 | Daniele ...................................... 380/3 |
| 5,450,379 | 9/1995 | Fujimori et al. ..................... 369/275.1 |
| 5,483,658 | 1/1996 | Grube et al. . |
| 5,495,411 | 2/1996 | Ananda . |
| 5,539,810 | 7/1996 | Kennedy, III et al. ................... 379/59 |
| 5,572,589 | 11/1996 | Waters et al. .............................. 380/4 |
| 5,694,471 | 12/1997 | Chen et al. ............................... 380/25 |

OTHER PUBLICATIONS

"PersonaCard™ 100/110 Data Security Tokens" brochure; National Semiconductor, Sunnyvale, CA; 4pp.; no date.

"PUB" brochure; RSA Data Security, Inc., Redwood City, CA; 12 pp.; 1993.

International Search Report; 9 Jan. 1997; 9 pp.

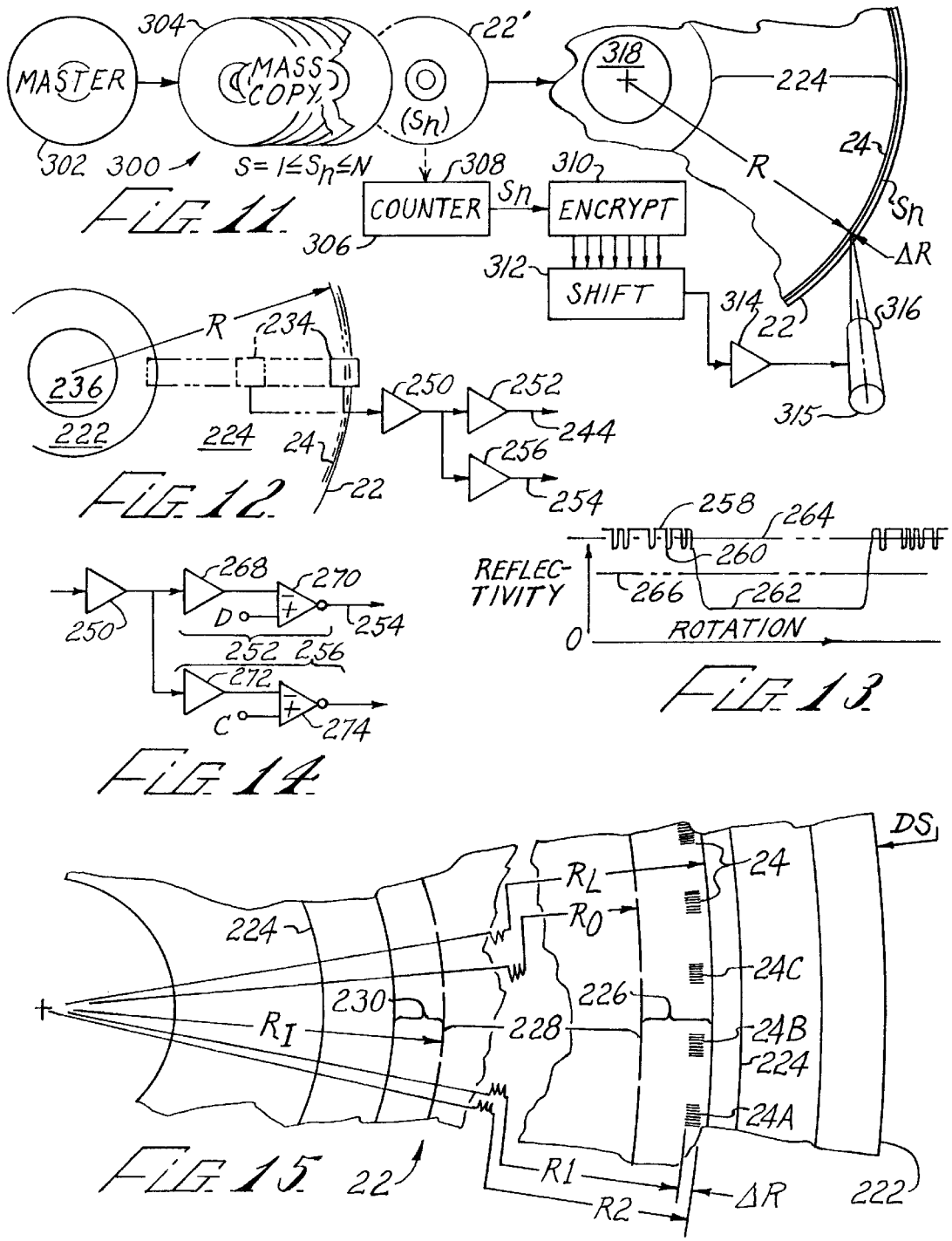

MASS STORAGE ELEMENT AND DRIVE UNIT THEREFOR

RELATED APPLICATION

This application is a continuation-in-part of application Ser. No. 08/410,132, filed on Mar. 23, 1995.

BACKGROUND

The present invention relates to multimedia systems using mass storage elements such as compact disks for accessing protected information, and to the application of such systems to personalized transaction management.

Multimedia systems are a relatively recent development combining computer and mass storage such as compact disk (CD) technology for efficiently accessing works including encyclopedias, vendor catalogs, nationwide telephone listings, legal and technical databases, video games, audio recordings, and video recordings such as full length movies. Such systems avoid the problems of accessing large quantities of data over telephone lines, for example, which include severe bandwidth limitations and significant utility charges. A major problem in this field is the prohibitively high cost of purchasing the stored works outright, particularly in the case of first-run full length movies in the first part of their home video rental release window.

It is known to encrypt stored data for permitting use thereof only by those having authorized access. It is also known to charge users according to the quantity of data that is decrypted. See, for example, U.S. Pat. No. 5,050,213 to Shear, which discloses a database metering and protection system and method.

A problem with the prior art, even as advanced by the disclosure of Shear, is that point of sale mark-ups are difficult and impractical to apportion according to use of the data. For example, a movie recording might be procured for unlimited private viewing, but for first run full length movies the charges would be very high as compared with viewing rights for a limited period such as 24 hours. Present marketing systems are not set up for handling both kinds of transactions for a single mass produced copy of a particular work. Also, there is no practical way to both meter authorized uses of the media while policing pirated copies. Thus many markets for multimedia products such as rental first-run movies are not being adequately served.

Thus there is a need for a multimedia system that supports a flexible marketing strategy including compensation for retailers that can be apportioned according to use of the stored works.

SUMMARY

The present invention meets this need by providing a mass storage drive that removably supports a mass storage element and includes a data head having an output for reading tracks of main data elements. The data head, which can be an optical head, is movable in a predetermined auxiliary path relative to the substrate for scanning a unique machine-readable serial identifier in auxiliary data containing at least 200 bits of information in one or more tracks being exclusive of the main data tracks. The mass storage element includes a substrate, a main storage media on the substrate and storing the main data elements, and an auxiliary storage media on the substrate and having the unique machine-readable serial identifier. As used herein, the main data elements are mass-stored data of the type to be read by a data head of a conventional compact disk drive when the data is recorded on a conventional compact disk. Similarly, the main path is movement of the type involving rotation of the disk in combination with tracking movement of the data head of such compact disk drive. Correspondingly, the auxiliary path is of the type involving rotation of the disk and positioning the auxiliary head means for accessing the auxiliary data elements.

The main data elements can be substantially read-only in character. The main storage media can be adapted for receiving the main data elements by press-molding. The main storage media can be adapted for receiving the main data elements by selective radiation. The main data elements can be optically readable. The substrate and the main storage media can be configured as a rotatable compact disk.

The auxiliary storage media can be adapted for being recorded and read by a single auxiliary head. The auxiliary storage media can be a magnetic coating. The auxiliary storage media can be adapted for receiving the auxiliary data elements by selective radiation.

The mass storage drive also includes a head circuit connected to the data head output and having a main amplifier with an output for signaling main data elements in response to the data head, the circuit having a separate auxiliary output for signaling the auxiliary data elements in response to the data head output. The head circuit can include an auxiliary amplifier for driving the auxiliary output. The main amplifier can include a first frequency response effective for passing the main data elements, and the auxiliary amplifier can have a second frequency response for passing the auxiliary data elements while effectively blocking the main data elements. The main amplifier can have a first reference connection for balancing the main output relative to a data threshold, the auxiliary amplifier having a second reference connection effective for balancing the auxiliary output relative to a serial code threshold of the data head when the data head is reading auxiliary data elements. The mass storage element can be a compact disk, the drive means including means for rotating the disk.

DRAWINGS

These and other features, aspects, and advantages of the present invention will become better understood with reference to the following description, appended claims, and accompanying drawings, where:

FIG. 7 is a functional block diagram showing an alternative configuration of a portion of the system of FIG. 1;

FIG. 11 is a pictorial schematic diagram showing a method and apparatus for producing a preferred form of the mass storage element of FIG. 1A;

FIG. 12 is a pictorial schematic diagram showing an alternative configuration of the disk drive unit of FIG. 1A, configured for use with the mass storage element of FIG. 11;

FIG. 13 is a graph showing reflectivity levels of serial coding as applied in an adjunct data region of the mass storage element of FIG. 1;

FIG. 14 is a schematic diagram showing an alternative configuration of a portion of the disk drive unit of FIG. 12; and FIG. 15 is a detail plan view showing further details of the mass storage element of FIG. 11.

DESCRIPTION

Figure 1:
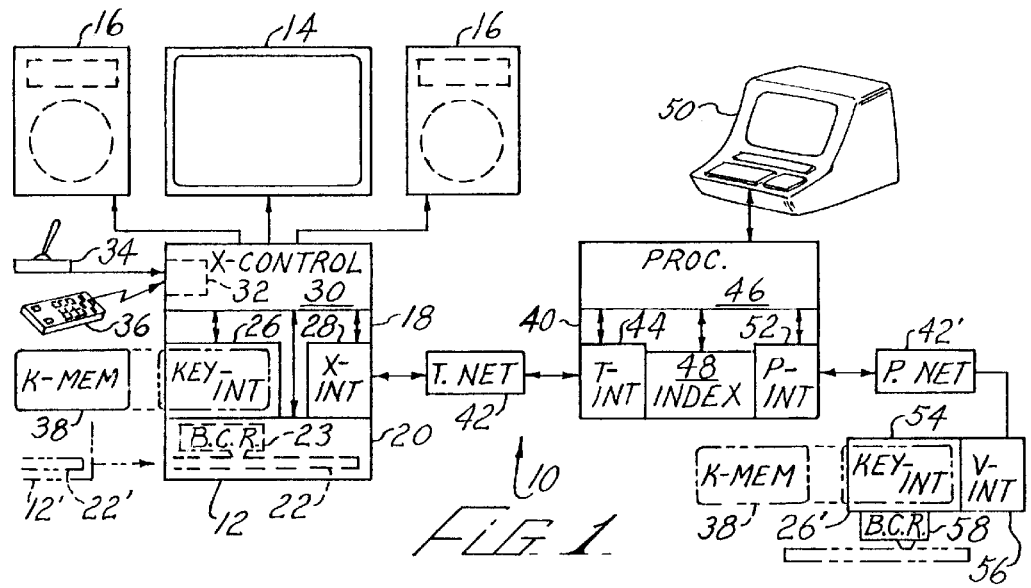
FIG. 1 is a pictorial block diagram of a multimedia system for personalized data access according to the present invention.

The present invention is directed to a multimedia transaction system that is particularly effective and versatile, inexpensive, and easy to use. With reference to FIGS. 1–6 of the drawings, a multimedia system 10 includes a transaction terminal 12 having a television monitor 14 which can be a conventional TV receiver, a pair of speakers 16, and a transaction unit 18. The transaction unit 18 includes a terminal drive unit 20 for accessing a selected mass storage element 22 which can be a high-density optical disk (CD), the drive unit 20 having conventional means (not shown) for reading information recorded on the element 22. CDS are particularly advantageous as mass media for distribution to a multiplicity of users in that they can be mass-produced by pressing from a master recording. The direct copying such as by pressing initially renders the copies indistinguishable from each other. The present invention provides for tracking individual copies of such mass-produced works for permitting a variety of initial and subsequent transactions involving the works.

Figure 1A:
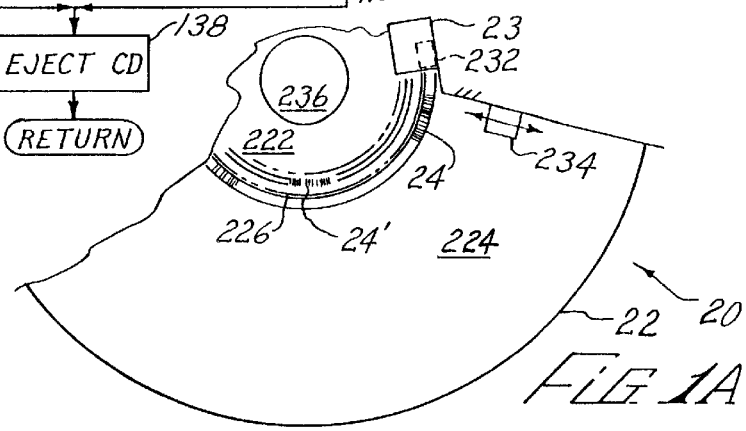
FIG. 1A is a partial plan view of a disk drive unit using a serialized mass storage element for use in the system of FIG. 1.

In an exemplary configuration of the system 10 shown in FIG. 1, the terminal drive unit 20 includes means for reading a unique serial number or code 24 that is formed in or on the mass storage element 22, the means being designated bar code reader 23. It will be understood that the bar code reader 23 can be provided as an extension of the tracking range of a conventional playback head of the drive unit 20 as an alternative to having a separate stationary (low resolution) head. Further, many conventional CDS have an inside track carrying a bar code that is mass-produced together with the mass-copied data, the mass-produced bar code identifying the particular work that is reproduced in the CD. The conventional bar code is used in existing inventory and stocking schemes, and is not intended to be read by ordinary CD players. As shown in FIG. 1A, the serial code 24 is located in the annular space of the CD 22 that can also contain the conventional bar code. One method for producing the serial code 24 is by laser-etching a reflective coating of the CD 22 that also contains the mass-produced data (and can also contain the mass-produced bar code). The serial code 24 is unique to each copy of the CD 22, and preferably includes further identification of the particular work, so that the work and the particular copy thereof are discernable by operation of the bar code reader 23. It will be understood that other methods of producing the serial code 24 are possible, including by application of an adhesive label, and by directly molding or pressing bar code elements into the CD 22 using movable die elements that are electrically driven under computer control. Also, the serial code 24 can be recorded together with other mass-stored data when the mass storage element 22 is a CD-R (recordable) disk. Further, other locations for the serial code 24 are possible, such as radially inside or outside of the mass-produced bar code. Moreover, it is preferred that at least a portion of the serial code 24 be alterable for recording status information as further described below. Accordingly, and with particular reference to FIG. 1A, a portion of the serial code 24, designated read/write serial code 24', is formed as a magnetic stripe using means well known in the credit card industry. Correspondingly, an important and preferred configuration of the system 10 includes the terminal drive unit 20 having the bar code reader 23 including a magnetic read/write head 232, and a main read head 234. The drive unit 20 is adapted for removably receiving the element 22, being configured as a rotatable compact disk having a substantially rigid substrate 222, on a disk drive 236, the main read head 234 being movable inwardly and outwardly relative to the disk drive 236 for accessing tracks of main data elements that are pre-stored in a conventional manner in a main storage media 224 on the substrate 222. The read/write serial code 24' is formed in an auxiliary storage media 226 of the element 22, the auxiliary storage media 226 being located for access by the read/write head 232. Magnetic material for the auxiliary storage media 226 to receive the serial code portion 24' can be applied as part of a process for labeling the CD 22. In implementations wherein only a portion of the serial code 24 is alterable, it is contemplated that the portion 24' be radially offset from the remainder of the code 24 as shown in FIG. 1A. The content of the serial code 24, including serial number, status and accounting information can be from approximately 200 bits of information up to approximately 2 Kb.

The transaction unit 18 also includes a key interface 26, a transaction interface 28, and transaction controller 30 for operating the terminal drive unit 20 in response to operator input and signals received from the key interface 26 and the transaction interface 28. The controller 30 includes an input interface 32 that can be wired to a joystick unit 34 for playing video games and the like, the input interface 32 being otherwise responsive to a wireless remote controller 36 that is shown in greater detail in FIG. 6, the remote controller 36 having a numeric keypad, transport controls, a mouse equivalent and possibly, a few special purpose keys.

An important feature of the present invention is local memory for managing authorized access to the mass storage elements 22. In one embodiment, the system 10 includes a key memory device 38 that is insertable into the key interface 26. The device 38, which can be slightly larger than a credit card, has machine-readable data stored therein, including a personal identification number (PIN) and a key code that is interrogated as further described below in connection with FIGS. 2 and 4 for permitting authorized access to restricted data portions of the mass storage element 22. The restricted data is preferably encrypted by means such as utilized by DES and described in FIPS Publication No. 46 (NTIS), incorporated herein by this reference. As also further described below, the key device 38 preferably has read-write memory for storage and retrieval of user data and transaction data for enhanced security and flexibility in managing transactions by a user of the device 38.

The terminal 12 is contemplated to be one of a multiplicity of such terminals 12 as indicated by dashed lines and the designation 12' in FIG. 1, the system 10 also including at least one transaction processing facility (TPF) 40 that intermittently communicates with the terminals 12 over a suitable terminal network 42 using a terminal interface 44. The TPF 40 also includes a database processor 46 for controlling and monitoring the terminal network 42, the processor 46 being also connected to a mass database memory or index 48, a service terminal 50 and, optionally, a provider interface 52 for communicating with a plurality of vendor terminals 54 over a counterpart of the terminal network, designated provider network 42'.

Each vendor terminal 54 can include a vendor interface 56 and a counterpart of the bar code reader, designated 58. The bar code reader 58 reads a unique serial number (which can contain a code corresponding to the title of the work) from each mass storage element 22 for tracking individual copies of each work. The bar code reader 58 corresponds to the bar code reader 23 of the transaction terminal 18, except that the mass-recorded information of the element 22 need not be readable by the vendor terminal 54 when the reader 58 is active. The bar code reader 58 can be implemented for reading labels on cartons containing multiple copies of the mass storage element 22, the labels identifying the work and a range of serial numbers on the elements 22 therein. As shown in FIG. 1, an exemplary configuration of the terminal 54 also includes a key interface 26' that corresponds to the key interface 26 of the transaction unit 18, but need only to read the PIN for identifying the user, for permitting a direct correlation of a particular user with the mass storage element 22 in a transaction involving the element 22. The correlation can be between the user and a particular copy of the element 22 when the code reader 58 reads the serial code 24 or counterpart thereof the element 22. When the code reader 58 reads a range of serial numbers, the user is correlated with a group of the elements 22 that are handled by the particular vendor. It will be understood that the monitor 14 can include the speakers 16 or, alternatively, a monaural speaker.

Transaction Terminal Set-Up

In an exemplary set-up protocol for the system 10 of FIG. 1, the user receives the transaction unit 18, the remote controller 36, the key memory device 38, a "start up" counterpart of the mass storage element or startup CD 22', and a printed installation manual. (In the alternative configuration of FIGS. 7–10, discussed below, the key memory device 38 is omitted, functions thereof being provided internal to a counterpart of the transaction controller 30.) The start up CD 22' and installation manual guide the (untrained) user through an installation process using the remote controller 36, no keyboard, mouse, or other computer-like device being required.

The installation manual explains how to make the preliminary connections to the transaction unit 18 in order to view the start up CD 22'. Also, because it is necessary to turn the transaction unit 18 and the TV monitor 14 off when making the final connections, the manual serves as a handy reference where the installation setup shown on the startup CD 22 can be copied. The startup CD 22' is normally retained by the user to serve as a troubleshooting guide and operational reference after the installation has been successfully completed.

Information (e.g. name, address, credit card number) required to access the services provided by the system 10 are provided to a trained customer service representative by means of a one-time telephone call placed by the user, the information being entered through the database processor 46 of the TPF 40 into the index 48 by the service terminal 50. As further described below, a data call is established between the transaction unit 18 and the TPF 40 over the network 42 for loading all of this information into the key memory device 38 (or other memory) using the key interface 26. This call is initiated by the transaction unit 18 or the TPF 40 depending on the particular system configuration. The transaction unit 18 then indicates (via the TV monitor 14) that it has received the initialization information and the user is ready to begin any of several applications. Trained installers can be made available for consultation by telephone once transaction unit 18 is connected to the TV monitor 14.

The transaction unit 18 plugs into an ordinary 120 volt AC outlet, a modular telephone jack, the antenna input of the TV monitor 14, and any other related home entertainment device, such as a VCR. The user connects the transaction unit 18 to power and television video, and also installs batteries into the remote controller 36.

To use the startup CD 22', the user turns on the transaction unit 18 and TV monitor 14 and places the startup CD into the terminal drive unit 20. The startup procedures on the CD utilize voice, graphical diagrams, and full motion video to demonstrate the installation in detail. The TV monitor 14 then displays a welcome message along with an overview of the operating instructions. The user then chooses installation options from the configuration guide on the CD and a parallel configuration guide in the manual. The user is instructed to copy the correct installation connections into the startup manual's installation guide, including hookups to the telephone, TV monitor 14, power, VCR, cable box, etc. Then, with power off, the user hooks up all of the connections in accordance with the installation guide and turns on the transaction unit 18. As described below, the transaction unit 18 checks that the installation is correct, and if not, displays an appropriate error message to the user via the TV monitor 14.

On the home telephone, the user calls the customer service operator on the 1-800 number provided to give the startup background information. A form is displayed on the TV monitor 14 and in the startup manual. The necessary background information includes names and PINs (personal identification numbers), telephone number, credit cards with expiration dates, address, credit/advance amounts to be stored with maximum, minimum, and thresholds, mailing addresses for purchases, and default mailing method. A data call is then established over the network 42 as described above, for sending the necessary information from the TPF 40 to the transaction unit 18. Communications between the TPF 40 and the transaction unit 18 are secured by appropriate data encryption. The use of public and private keys for encryption/decryption is contemplated in the present invention. Public/private key protocol is available under license from RSA Data Security Corp. of Redwood City, Calif., being described, for example, in U.S. Pat. No. 4,405,829 to Rivest et al., which is incorporated herein by this reference. Information downloaded from the TPF 40 to the transaction unit 18 is displayed onto the TV monitor 14 for confirmation by the user. If any information is incorrect, the user can then correct it on-line or place a follow up call to the 1-800 operator. When this screen is filled in and correct, the transaction unit is ready to play.

Figure 2:
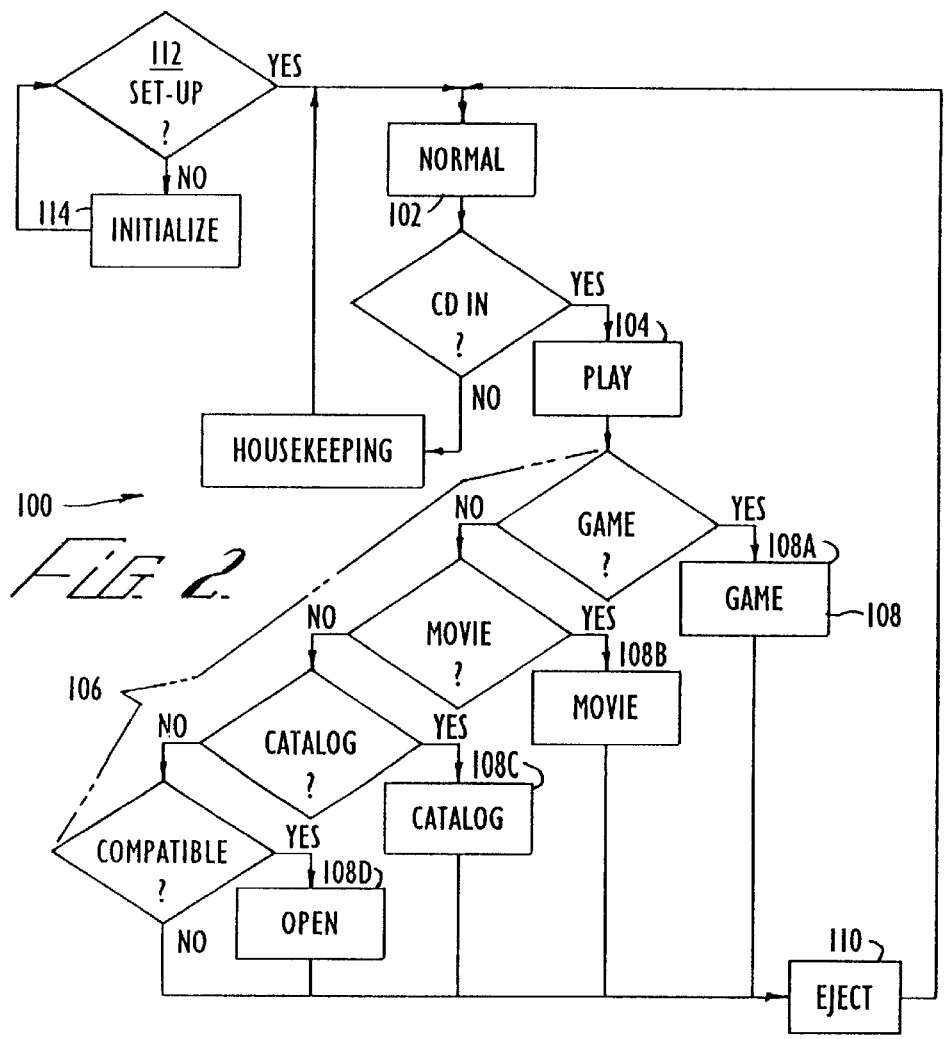
FIG. 2 is a main program flow diagram of the system of FIG. 1.

With particular reference to FIG. 2, the transaction controller 30 is firmware-programmed in a main routine 100 for appropriate operations with the mass storage element (CD) 22 in one of several formats. Following the one-time initialization that is described below in connection with FIG. 3, control is passed to a normal start step 102 and upon loading of the CD 22, the terminal drive unit 20 is activated in an initial play step 104 for reading header information from the CD 22, that information being interrogated in a format test sequence 106 for branching to an appropriate play routine 108, which can be a game routine 108A, a movie routine 108B, a catalog routine 108C, or an open routine 108D.

When play is complete or otherwise terminated as described below, control is passed to an eject step 110, then returned to the normal start step 102.

Figure 3:
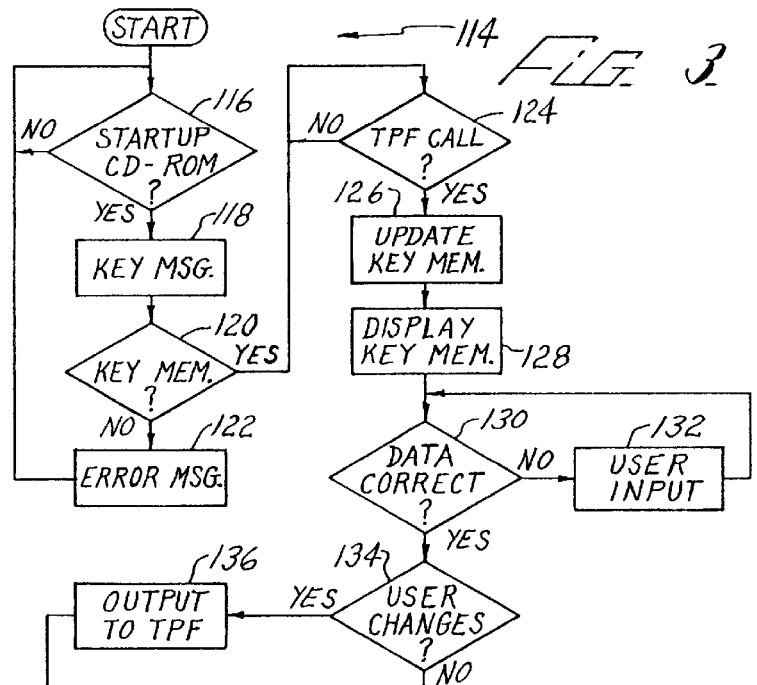
FIG. 3 is a program flow diagram for initializing the system of FIG. 1.

The main routine 100 further includes a set-up test step 112 that is automatically entered upon power up for determining whether the transaction unit 18 has been initialized. If so, control is passed to the normal start step 102; otherwise, a set-up routine 114 is performed as shown in FIG. 3. In the set-up routine 114, a test startup CD step 116 blocks further processing until the startup CD 22' that is formatted for initialization is present. Next, a message prompting insertion of the key memory device 38 is sent to the TV monitor 14 in a key prompt step 118, followed by a test key step 120 for determining the presence of and valid communication with the key memory device 38. (As indicated above, the key memory device 38 is omitted in the alternative configuration of FIGS. 7–10, discussed below.) If the valid communication is established within a predetermined time limit, control is passed to a test TPF call step 124; otherwise, an error message step 122 appropriately signals the TV monitor 14, with control returning to the test startup CD step 116.

In the test TPF call step 124, the set up routine 114 waits for completion of a data call with the TPF 40 as described above, the PIN and other personal data being transmitted over the transaction network 42 during the call. The received data is stored in flash memory (of the key memory device 38 or elsewhere in the transaction controller 30) in a user data update step 126, the data also being displayed on the TV monitor 14 in a user data display step 128. The received data also includes a date by which a subsequent TPF telephone contact is expected. Next, a test data step 130 is entered for the user to verify whether the displayed data is consistent with that given verbally to personnel operating the TPF 40. If not, a user input step 132 is entered for permitting user corrections to be made, after which the test data step 130 is repeated. Once the user is satisfied with the entered personal data, control is passed to a test changes step 134 for invoking a transmit data step 136 in case changes were made, the set-up routine 114 concluding in an eject CD step 138. In the transmit data step 136, the edited personnel data is transmitted over the transaction network 42 to the TPF 40 where it is stored for further use as described below.

Normal Operations

In normal operations, a session begins when the user inserts a selected CD or mass storage element 22 into the terminal drive unit 20 of the transaction unit 18. Operations are displayed on the TV monitor 14 in an intuitive graphical user interface while the user makes selections with the remote controller 36 from the choices displayed. Available operations are determined by the type of mass storage element 22 inserted into the terminal drive unit 20. At this point, if the transaction unit 18 has received a text message from the TPF 40, the user will be informed, for example, that certain catalogs have been updated or that certain promotions are in effect. The user is prompted to make selections, using the remote controller 36 to select items on the TV monitor 14, to progress through the session.

Preferably messages, commands, or updated information transmitted from the TPF 40 are accompanied by a new date by which a subsequent TPF 40 contact is expected. If there has been no call prior to this date, then the transaction unit 18 is to automatically initiate a call for updated instructions from the TPF 40. If the transaction unit 18 is unable to contact the TPF 40, then the user is advised in an error message to check the telephone line. This error message is repeated each time the unit 18 has a CD 22 inserted until the call to the TPF 40 is completed. After a set number of days without contact with the TPF 40, then the firmware in the transaction unit 18 will cause the unit 18 to disable its own operation.

At appropriate points in each session, the transaction unit 18 prompts the user to insert the key memory device 38 into the transaction unit 18, if it is not already in place, and enter a counterpart of the personal identification number (PIN) using the remote controller 36, as further described below. Each person in a household may have his own PIN number stored on the key memory device 38 to uniquely identify each authorized user to the transaction unit 18. Credit information, restrictions on use (such as viewing up to PG rated movies only), catalog ordering information, etc., are associated with each PIN number, this information being duplicated at the TPF 40. Although most entertainment mass storage elements 22 are assigned a "pay per play" or "pay for a designated period of time" arrangement, as further described below, it is possible to "free preview" an initial portion of the element 22 that is not required to be encrypted. Also, all portions of a catalog are normally accessible without entering a PIN as described below, unless information in the catalog is restricted, such as information that would not be appropriate for children.

The system 10 is configured to minimize use of the user's home telephone or other network channel, both in terms of the number and the duration of calls. Other than the cost of a local telephone call, all related voice and data telephone call charges of the system are contemplated to be free to the user. Still, in view of the computer or fax modems typically in home offices, or when teenagers are present, there is competition for use of a single home telephone line. Therefore, if the home telephone is in use when the transaction unit 18 attempts to call the TPF 40, the transaction unit 18 can be programmed to retry the telephone call at a later time until successful. Alternatively, a data-over-voice protocol is contemplated.

Catalog Shopping

For catalog shopping, the user receives catalog mass storage elements 22 in the mail or by other appropriate channels. After inserting the catalog CD element 22 into the terminal drive unit 20, the transaction controller 30 causes header information to be read from the CD 22 in the format test sequence 106. In the case of catalogs, the sequence 106 checks for a digital signature to determine that the catalog is authorized for use on the system before entering the catalog routine 108C as described above. The catalog routine 108C enables the user to browse or search for specific items, normally without entering a PIN as described above. Only when the user actually orders an item is the PIN necessary. In the implementation of FIG. 1, the user can elect to view the mass storage elements 22 at a neighbor's home or a second house having a counterpart of the transaction unit 18, and can place orders provided the user's key memory device 38 is present.

The presentation of catalog items by the system 10 is greatly enhanced by use of stereo sound, graphics, text, and full-motion video combined in easy to use multimedia format. At any time while browsing through the catalog, the user may select single or multiple items for purchase. The transaction unit 18 automatically sends the order to the catalog retailer's order entry computer via the TPF 40. Using the transaction unit 18, the user quickly receives confirmation of availability and total price of the order. Filling out the order on the TV monitor 14 requires only selecting the items desired, as all necessary information pertaining to the user is already stored on the user's key memory device 38 (or other memory of the transaction controller 30). After the system 10 completes the order form and sends it to the retailer's computer, the retailer's normal fulfillment procedures are invoked, and the purchased items are mailed directly from the catalog retailer to the user. Any problems or returns are dealt with by the retailer and any reversals of charges that may be required are accomplished automatically and recorded by the database processor 46 of the TPF 40.

Alternatively, the user can elect to use the telephone for placing an order with the catalog retailer's operator. Confirmation of the order and the purchase orders are mailed directly from the catalog retailer to the user. Any problems or returns are dealt with by the retailer, including reversal of charges.

The transaction unit 18 is intended never to be turned off, going into a standby mode when not being used in order to receive catalog updates and promotional messages. Thus catalog retailers are also able to keep pricing current through communications to the transaction unit 18, even after the catalog has been published. In addition, close coordination with catalog retailers, combined with the two way communications capability of the system 10, enables both the user and the retailer to benefit from the availability of special sale prices on a daily basis.

Movies

A major feature of the system 10 is the capability of playing full length feature movies on a single mass storage element or CD 22. These movies are distributed in a variety of ways, such as from video stores, vending machines, or through the mail. Because of the minimal manufacturing cost of CDs, they do not need to be returned to the video store or any other distribution center. Thus the user can maintain a movie library at home for personal use or to give or lend to others.

Figure 4:
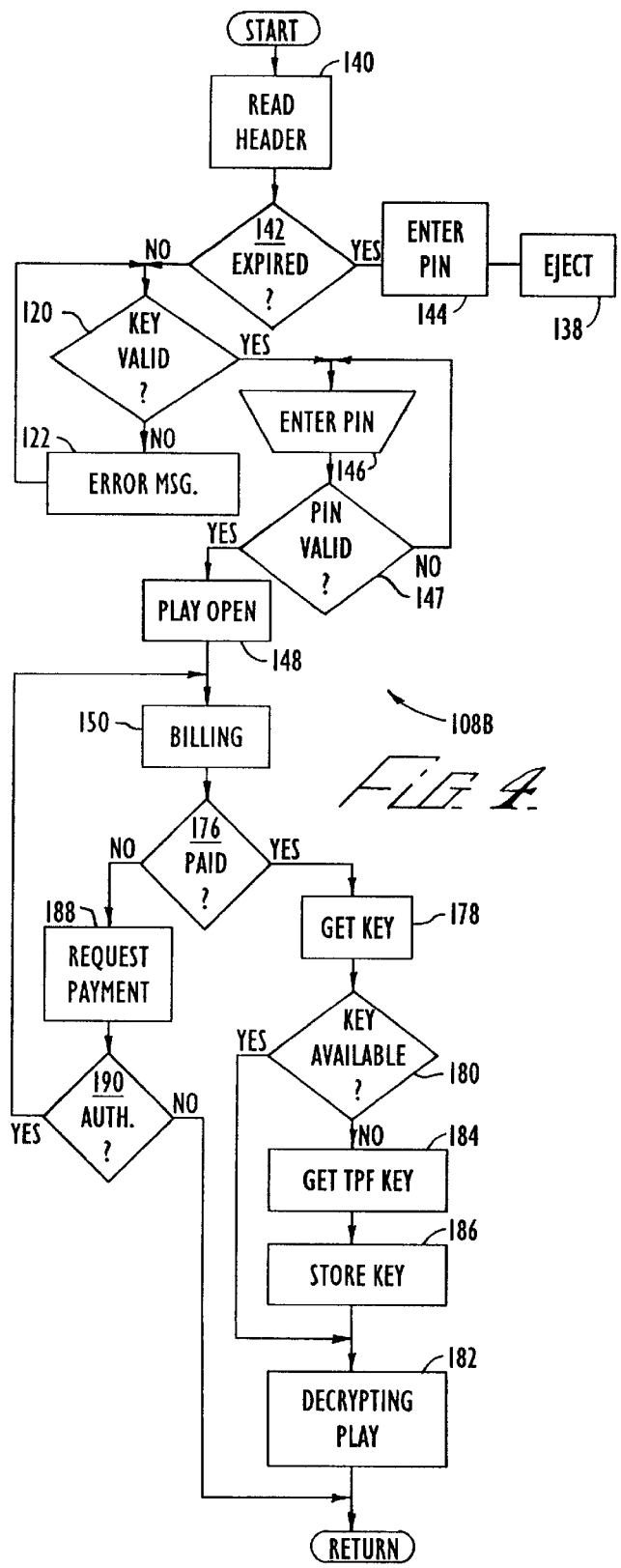
FIG. 4 is a program flow diagram for playing movies on the system of FIG. 1.
Figure 6:
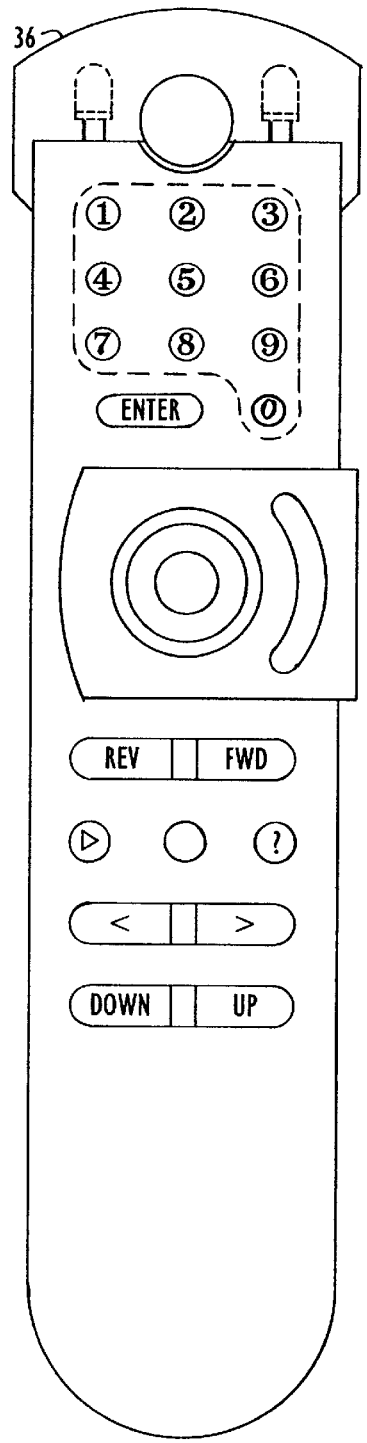
FIG. 6 is a plan view showing a remote control unit of the system of FIG. 1.
Figure 5:
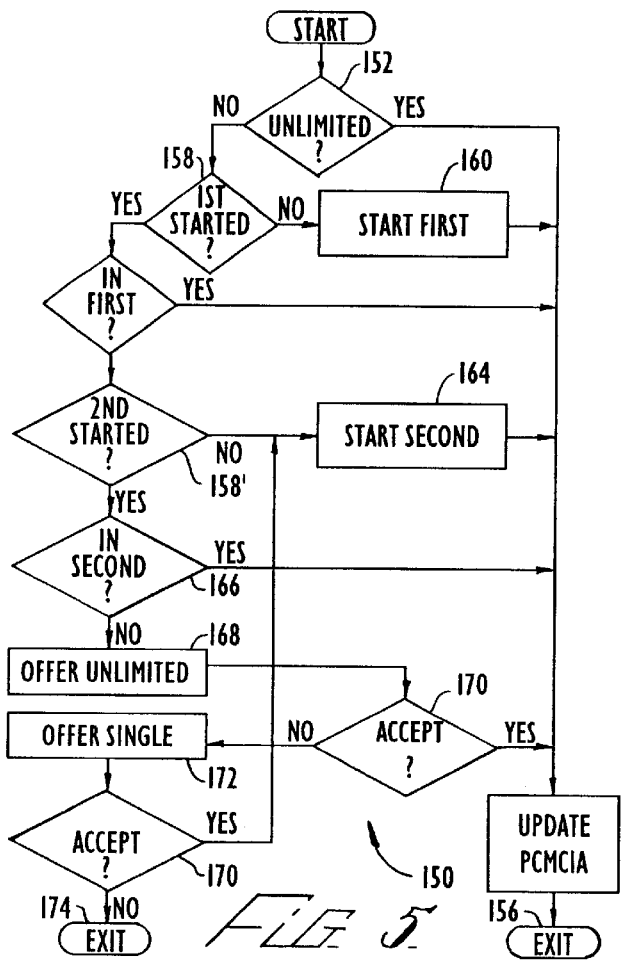
FIG. 5 is program flow diagram for a billing portion of the program of FIG. 4.
Figure 2:
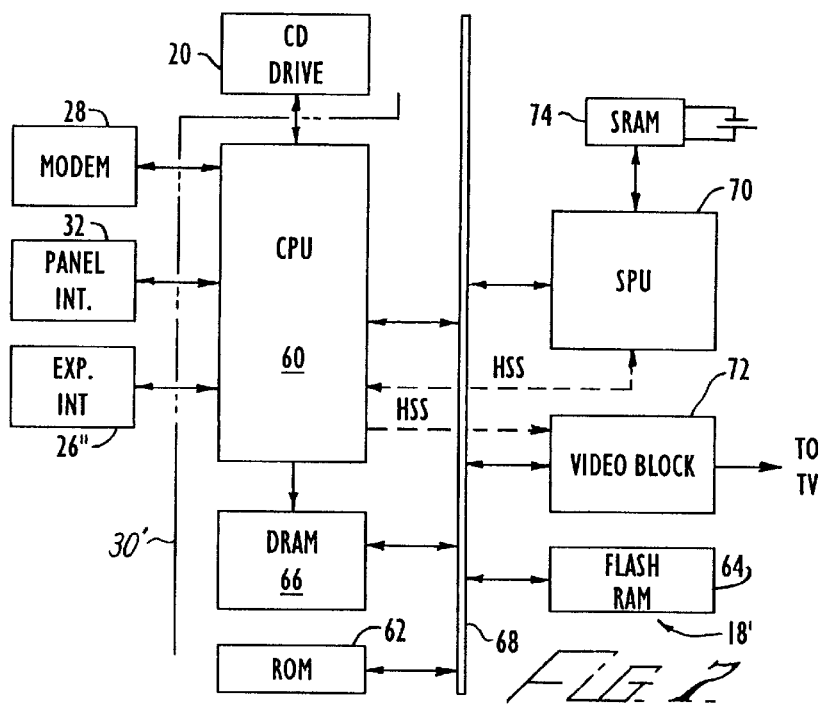
Figure 8:
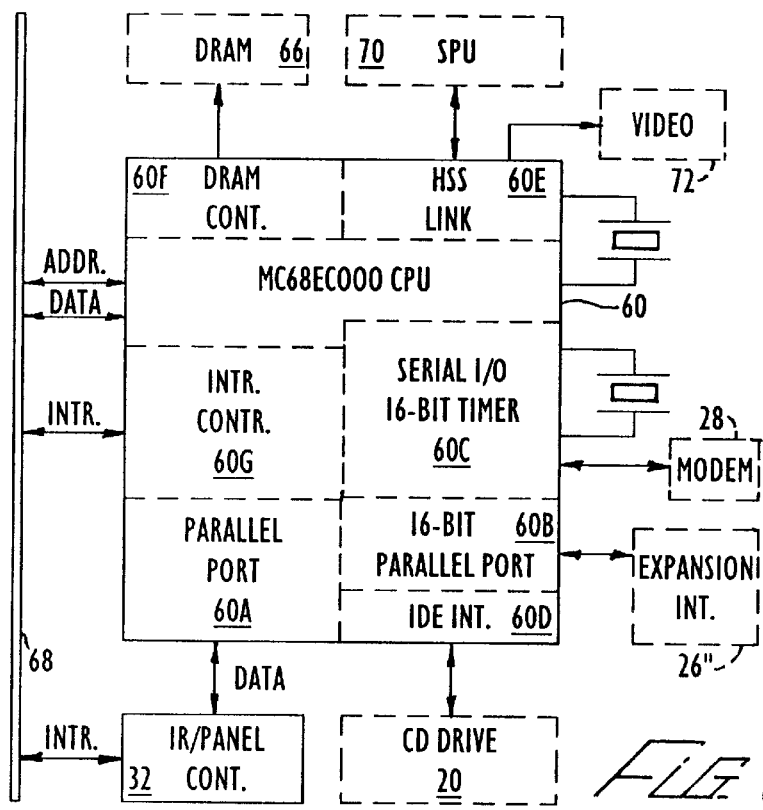
FIG. 8 is a block diagram of a processor section of the system portion of FIG. 7.

In an exemplary transaction, the user picks up a movie CD at the local video store and pays a small usage charge that covers two 24 hour viewing periods. Once the mass storage element 22 in the form of a movie CD 22 is loaded into the terminal drive unit 20, control is passed to the movie routine 108B as described above. With particular reference to FIGS. 3 and 4, the movie routine 108B first obtains header information including a billing rate and expiration date from the CD 22 in a header step 140. Next, the expiration date is compared with an internal calendar in a test expiration step 142 for determining possible expiration of authorized use, in which case an appropriate message is displayed in an expired message step 144, followed by termination of the movie routine 108B using a counterpart of the eject CD step 138.

If the CD 22 has not expired, control passes to counterparts of the test key step 120 and the error message step 122 (until the key memory device 38 is in place in the configuration of FIG. 1), at which point the user is required to enter a valid PIN in an enter PIN step 146. Next, the drive unit 20 is activated in a play open step 148 for playing selected information from the CD 22, the selected information being typically a free preview of the main contents of the CD 22.

Following the play open step 148, and while the unencrypted information is being played from the CD 22, control is passed to a billing routine 150. As shown FIG. 5, the billing routine 150 first determines whether the CD 22 is owned for unlimited play in a test unlimited step 152. In the embodiment of the system 10 shown in FIG. 1, serial numbers and ownership status of each CD 22 can be stored in memory of the key memory device 38. Alternatively, such information can be stored in other memory of the transaction unit 18. The same information is also stored in the index 48 of the TPF 40. However, a call over the transaction network 42 for accessing same is initiated only in the event of a malfunction or other extraordinary circumstance in order to avoid unnecessary delay and usage of the network 42. If there is unlimited ownership, control is passed to an update memory step 154 wherein flash memory of the key memory device 38 or other non-volatile memory of the transaction unit 18 is updated if necessary, after which authorization for playing the main contents is returned to the movie routine 108B via an authorized exit step 156. It will be understood that the update memory step 154 can include overwriting the read/write serial code 24' with the current authorization status of the CD 22. Thus further testing of the status of the CD 22 can be implemented locally without placing a telephone call to the TPF 40. In this implementation, decryption key information for the CD 22 is pre-loaded into the transaction terminal 18 during previous telephonic communication. Thus the number of communications between the transaction terminal 18 and the TPF 40 is significantly reduced, with corresponding cost savings.

In case unlimited play was not previously authorized, control is passed from the test unlimited step 152 to a test start step 158 for determining whether a first timed billing period had previously been initiated. If not, initiation of the first period is done in a start first step 160 by retrieving the current date and time, with control being passed to the update memory step 154 for storing the current date and time in an appropriate memory location. If the first period had been initiated, expiration thereof is determined in a test first period step 162 wherein the previously stored date and time, plus a predetermined duration of the first period (24 hours, for example), is compared with the current date and time. If the first period remains in effect, control is passed to the update memory step 154 (which can be alternatively bypassed here); otherwise, a counterpart of the test start step, designated 158', is performed for determining whether a second timed billing period had been started. If not, a counterpart of the start first step 160, designated start second step 164, is done, followed by the update memory step 154 as described above; otherwise, a test second period step 166 for determining whether the second period has not expired, in which case control is passed to the update memory step 154 as described above; otherwise, an option for unlimited play is presented on the TV monitor 14 in an offer unlimited step 168, after which a test accepted step 170 is executed for determining acceptance of the offer by the user. Upon acceptance, control is passed to the update memory step 154 for storing the unlimited play election; otherwise, an alternative option is presented in an offer single view step 172, which is followed by a counterpart of the test accepted step 170. Upon acceptance, control is returned to the start second step 164, followed by the update memory step 154 for storage of acceptance and initiation of the "second" billing period. If the single view offer is refused, an unauthorized exit 174 is taken for reflecting same in returning to the movie routine 108B.

Following the billing routine 150, control is passed in the movie routine 108B to a test paid step 176 for determining whether use beyond that previously paid for was requested. If not, the required decryption key is requested from the key memory device 38 in a get key step 178, and a test key step 180 is executed for determining successful access to the key. If the key was available from the device 38 (or elsewhere in the transaction unit 18), control is passed to a decrypting play step 182 for continuing play of the CD 22 beyond the initial unencrypted portion. Upon completed play of the movie, program control returns to the eject step 110 of the main routine 100. If unavailable in the transaction terminal 18, the decryption key is obtained by telephone using the transaction network 42 in a get TPF key step 184, followed 1by a key store step 186 in which the key is stored in appropriate non-volatile memory (of the key memory device 38).

From the test paid step 176, a payment request step 188 is performed wherein an appropriate message is sent to the TV monitor 14 for requesting payment authorization. A test authorization step 190 returns control to the billing routine 150 if authorized; otherwise, control is passed to the main routine 100 for ejection without further play of the CD 22.

As described above, the first viewing period starts from the time of first play, not when the CD 22 leaves the store. The second viewing period may start at any time thereafter. This approach provides the consumer with a more convenient and cost-effective means for obtaining movies than by traditional video store time rental services. If the user subsequently decides to acquire additional 24 hour viewing periods, no further action on his part is required. He merely plays the CD 22 on the transaction unit 18, and an incremental usage fee will be automatically charged to his account. Also, the user may instead decide to purchase the movie for unlimited play, which transaction can also be implemented from the convenience of home on the transaction unit 18.

Other Uses

The system 10 is also designed for the user to play video games and other multimedia entertainment CDs 22 using the joy stick unit 34 to play games or navigate through multimedia applications. Existing multimedia personal computer CDs can be supported by the system 10, the publisher being able to change the price/use combination at the TPF 40.

The terminal drive unit 20 of the system 10 also has the capability to play standard audio formatted CDs, just like a standard audio CD player, the transaction unit 18 having stereo outputs for connecting to the user's amplifier or surround sound system for providing high fidelity sound. Track selection and other functions can be selected by the remote controller 36. The transaction unit 18 can be configured to further enable the user to display images on a Kodak® Photo CD, the images being viewed using the remote controller 36 with Photo CD Access software.

The transaction unit 18 is like a blend of an audio CD player, a multimedia personal computer and a laser disk player, all housed in a single box about the size of a consumer VHS player. Accordingly, the transaction unit 18 provides a subset of operations and connections found on each of these entertainment systems, in addition to the key interface 26 (and/or flash memory of the transaction controller 30), the transaction interface 28, and the transaction controller 30.

As described above, correlation of the mass storage element 22 with transactions involving same is achieved by operation of the vendor terminal 54, wherein the particular serial numbers of the CDs 22 that are sold by that vendor are read by the bar code reader 58 and transmitted to the index 48 of the TPF 40. At the same time (or at a different time) other data unique to the user can also be transmitted from the vendor terminal 54 to the index 48 for correlating vendor sale of the element 22. Also, the transaction terminal 18 provides correlation of the element 22 with user play transactions by operation of the bar code reader 23 in conjunction with the key memory device 38, the key memory device 38 (or other memory of the terminal 18) being loaded with user and serial number authorization data as provided from the TPF 40.

Another correlation capability is achieved by tracking blocks or ranges of serial numbers on mass storage elements 22 that are delivered to particular vendors, that information being stored in the index 48 of the TPF 40. When the user of the terminal 18 attempts to play the mass storage element or CD 22, the serial number is read by the bar code reader 23, the number being correlatable with the corresponding number (or range containing the number) in the index 48 for associating the element 22 with the particular vendor that sold it, thereby enabling payments for plays of the element 22 beyond what was initially sold to be made to the vendor. In this example, the correlation, which is also based on the serial number of the CD 22, is first made using communications with the TPF 40 over the terminal network 42, with appropriate authorization and decryption data being stored in the key memory device 38, subsequent plays in accordance with the authorization being monitored locally by the transaction terminal 18.

In another example, the title and other data identifying the particular work sold, the type of sale (limited or unlimited play), and the purchaser, is transmitted from the vendor terminal 54 to the TPF 40 over the provider network 42' for storage in the index 48. Correlation is accomplished at the transaction terminal 12 as in the previous example, based on the title and other identifying data (but not a unique serial number) under the presumption that only one copy of a particular work would be purchased by a single user, or the copy in use is the one most recently purchased by the user. Thus it is not required to use either of the bar code readers 23 or 58. In this example, the title and other data needed for identifying a particular work is stored in the index 48 together with data identifying the vendor and the purchaser (user).

Alternative Configuration

Figure 10:
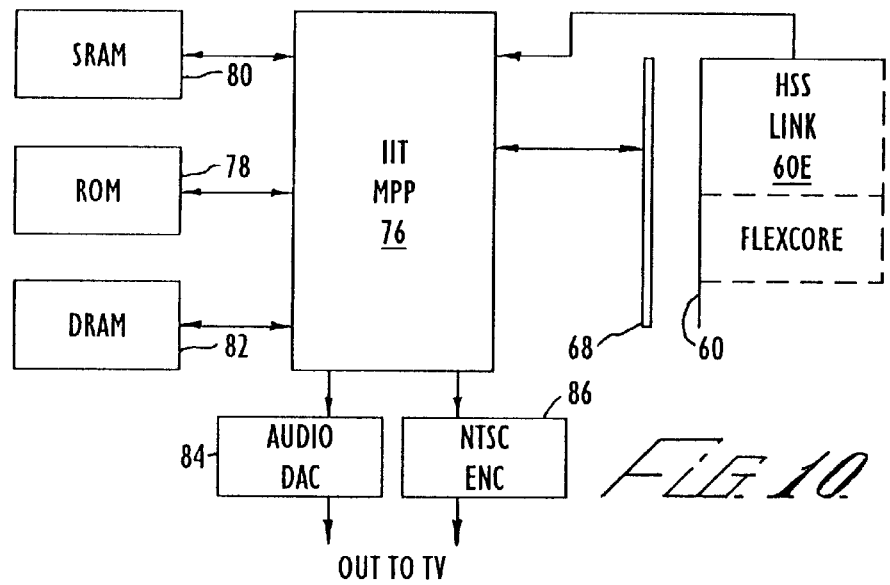
FIG. 10 is a block diagram of a video section of the system portion of FIG. 7.

With further reference to FIGS. 7–10, an alternative configuration of the transaction unit 18 has a counterpart of the key memory device 38 incorporated integrally with a counterpart of the transaction controller, designated 30'. FIG. 7 shows the controller 30' including a computer processor 60, system memory including a ROM 62, flash RAM 64 and a DRAM 66 interfaced with a system bus 68, the DRAM 66 also being directly connected to the processor 60. The processor 60, which is shown in greater detail in FIG. 8, has internal thereto a first parallel port 60A connected to the input interface 32, and a second parallel port 60B connected to a counterpart of the key interface 26, designated expansion interface 26", that provides expansion and local data exchange capabilities as described below. The processor 60 also includes a timer/serial port 60C that is connected to the transaction interface 28, and an IDE interface 60D that is connected to the terminal drive unit 20. Further, the processor 60 includes a high-speed interface 60E that feeds a secure processing unit (SPU) 70 that provides other functions of the key memory device 38 as described below, and a video block 72 that is shown in FIG. 10 and described below, the SPU 70 and the video block 72 also being connected to the system bus 68 as shown in FIG. 7. Moreover, the processor 60 includes a DRAM controller 60F and an interrupt controller 60G that is connected to interrupt lines of the system bus 68, the interrupt lines also being connected to the input interface 32 for responding to operator intervention. The DRAM controller feeds address and control signals to the DRAM 66, memory data being bidirectionally communicated over the system bus 68. A device suitable for use as the computer processor 60 is available as a MC68EC000 "flex core" CPU from Motorola of Phoenix, Ariz. The ROM 62 can have a conventional 512K×16 bit configuration, the flash RAM 64 can be implemented as 2 Mbytes of serial disk-drive storage, and the DRAM 66 can be in a conventional 256K×16 configuration having 80 nS access time.

The secure processing unit or SPU 70 is responsible for all encryption, decryption, transaction, and security requirements of the transaction unit 18. An SRAM 74 is interfaced with the SPU 72 separately from the system bus 68 for maintaining the contents thereof secure from unauthorized access. For example, the expansion interface 26" is firmware programmed for access to the terminal drive unit, the transaction interface 28, and the SPU 70, but not restricted data that is stored in the SRAM 74. The SRAM 74 can be implemented as a conventional 32K×8 CMOS device.

The SPU 70 contains a limited amount of on-chip memory for data and transaction storage. Additional information can be encrypted and stored in the main system memory (the flash ram 64 and the DRAM 66). The SPU 70 is intended to provide a sustained decryption rate of 1.2 Mb/S. The SPU 70 can be a bus master device, with conventional bus arbitration logic (not shown) being implemented between the SPU 70 and the processor 60.

Licensed public-key cryptographic algorithms can be used to manage key distribution and to provide digital signature capability to the transaction unit 18. The SPU 70 contains the secret keys of secret-public key pairs that are unique to each SPU 70 of the multimedia system 10. As indicated above, the secret-public key protocol, including encryption and decryption as disclosed in U.S. Pat. No. 4,405,829, is included under license from RSA Data Security Corp. The SPU 70 generates digital signatures when establishing communication with the TPF 40. The digital signatures are verified by the SPU 70 before certain restricted data such as catalogs and instructions from the TPF 40 are permitted to be processed by the transaction unit 18. The SPU 70 is contemplated to incorporate other physical and functional features that render unauthorized interrogation and/or reverse engineering either impossible or impractical. Such features can include isolation of internal memory address locations from external connections until appropriate access codes are applied, and electromagnetic shielding for blocking x-ray analysis, for example. A device suitable for use as the SPU 70 is being made available based on internal reference No. SPU2.0/PV3, from National Semiconductor Corp. of Sunnyvale, Calif.

Figure 9:
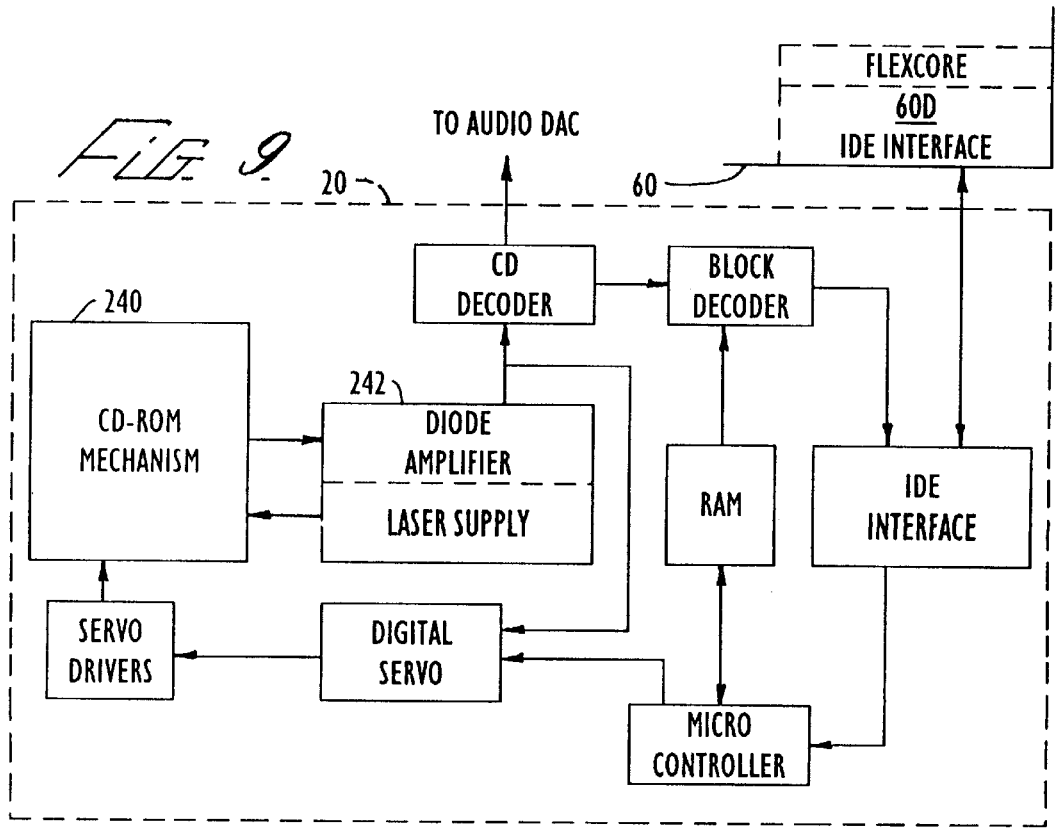
FIG. 9 is a block diagram of a CD drive section of the system portion of FIG. 7.

FIG. 9 shows a preferred implementation of the terminal drive unit 20, implemented in a conventional manner for playing full motion video (movies), except that quad density playback is contemplated. It will be understood that the total capacity of each CD 22 is proportional to the recording density and to the effective area of the recorded medium. Thus there is a trade-off between the size and the density of the CD 22 for obtaining a desired playing time using a given recording format. Also shown in FIG. 9 is a separate audio output for use in playing conventional audio disks, which output can directly drive an audio decoder that is described below in connection with FIG. 10.

As shown in FIG. 10, an exemplary implementation of the video block 72 includes a full motion decompression processor 76 having locally interfaced memory including a ROM 78, an SRAM 80, and a DRAM 82. The decoder 76 feeds an digital-audio converter 84 and a NTSC encoder 86, the converter 84 and encoder 86 feeding respective analog audio and video signals to the TV monitor 14. The ROM 78 can have 64 Kb capacity, the SRAM 80 can be organized as 4×32 Kb with 25 nS access time, and the DRAM 82 can be organized as 4×256K×16 bits having 70 nS access time. A device suitable for use as the decompression processor 76 is available as IIT 3201 MPP, available from Integrated Information Technology, Inc. of Santa Clara, Calif. Alternatively, the DRAM 82 can incorporate the functions of the ROM 78 and the SRAM 80, being operated in fast page mode with 45 ns access time. Another device suitable for use as the decompression processor 76 is available as STI3500A, available from SGS-Thomson Microelectronics Inc. of Carrollton, Tex. A device suitable for use as the digital-audio converter 84 is available as TDA 1310 from Philips Semiconductor of Sunnyvale, Calif. A device suitable for use as the NTSC encoder 86 is available as SAA 7188A from Philips Semiconductor.

As described above, the serial code 24 can be located either inside or outside the conventional mass-produced bar code. Particularly advantageous locations for the serial code 24 are outside of the mass-recorded data but within the physical range of and readable by the main read head 234. With further reference to FIGS. 11, 12, and 15, an important and preferred configuration of the storage element (CD) 22 has the serial code 24 located within the main storage media 224 and outside of the mass-recorded data, the mass-recorded data being substantially confined within a boundary radius R, the serial code 24 occupying a narrow annulus of width $\Delta R$ as shown in FIG. 11. More particularly, the width $\Delta R$ can be within a "leadout" region 226 as shown in FIG. 15, the leadout region 226 having further shown in FIG. 15, the leadout region 226 surrounds a main data region 228 that contains mass-recorded data of the work to be output from the terminal drive unit 20, the main data region 228 having an inside radius $R_I$, and an outside radius $R_O$. An annular "leadin" region 230 extends outwardly to the inside radius $R_I$, the regions 226, 228 and 230 being within the main storage media 224.

FIG. 11 shows a process 300 for producing the CD 22, including a master step 302 for preparing a master record, followed by a mass record step 304 in which counterparts of the master record are copied onto a multiplicity of substrates 222 having the main storage media 224 thereon. Typically, the mass record step 304 can include press-molding the substrate 222, followed by applying a reflective metalization layer. It will be understood that the data can be recorded in encrypted form, and that the data can be differently encrypted on various ones of the substrate 222.

A serializer apparatus 306 is then used in the process 300, the apparatus 306 having a counter 308 is incremented with the passage of each of the mass-recorded substrates 222, feeding a serial number $S_n$ to an encrypter 310. The serial number $S_n$ can range from 1 to N where N is the total number of mass recordings to be made from a single master. It will be understood that other protocols for the serial number are contemplated. The encrypter 310 scrambles the serial number, either alone or in combination with other information such as a work identifier and/or authorization level as discussed above, and feeds the resulting composite code to a shift register 312. The composite code is serially presented by the shift register 312 to a driver 314 that feeds a selective radiation device such as a laser etcher 316 for selectively altering the main storage media 224, thereby creating the serial code 24 of the CD 22. The laser etcher 316 can include a conventional fixed laser device that operates in conjunction with an acoustic optical modulator (AOM) and an optical focusing system to selectively irradiate a region of approximately 25 micron diameter sufficiently to etch the metalization layer of the CD 22, the CD 22 being rotated in a predetermined manner by a counterpart of the disk drive 236, designated 318. Thus, the process 300 in the exemplary configuration of FIG. 11 includes the further steps of counting the CDS 22 for generating a unique serial number associated with each copy from the master, encrypting the serial number, and writing the encrypted result as the serial code 24 within the main storage media 224 of the completed CD 22. It will be understood that generation of the serial code 24 in a single pass as described above results in the width ΔR being approximately 25 microns. Alternatively, the focusing system of the laser etcher 316 can be configured for producing a radially narrower etch, and the serial code 24 can be generated in multiple passes (rotations of the substrate 222) with the etching being done at progressively changing radii for forming the serial code 24 with the width ΔF being greater than the etching width by any desired amount. Further, the etching can be done in segments that are angularly dispersed for preserving sufficient information content of the "leadout" data to retain functionality such as for servo head tracking. The disk drive 318 can include counterparts of the main read head 234 and associated components (not shown) for verifying successful completion of the etching and initiating appropriate corrective action, if necessary.

As further shown in FIG. 9, discussed above, the drive unit 20 includes a CD ROM mechanism 240 and a diode amplifier/laser supply 242, the diode amplifier thereof having a main output 244 that feeds a CD decoder 246 and a digital servo circuit 248 that controls the motion of the main read head 234 (FIG. 1A). FIG. 12 shows a preferred configuration of the drive unit 20 for use with the CDS 22 as produced by the process 300. As with many conventional CD drives of the prior art, the main read head 234 is movable outwardly beyond the boundary radius R for purposes known to those having skill in the art, the main storage media of conventional CD elements also so extending. The drive unit 20 of FIG. 12 includes a preamplifier 250 that feeds a main amplifier 252, producing the main output 244 for use as in FIG. 9, above, the preamplifier 250 and the main amplifier 252 together corresponding to the diode amplifier in the circuit block 242 in FIG. 9. In further accordance with the present invention, the diode amplifier counterpart of FIG. 12 has an auxiliary output 254 that is fed from upstream of the main amplifier 252, such as by an auxiliary amplifier 256 that is driven by the preamplifier 250.

It is contemplated that the data density of the serial code 24 is typically significantly lower than that of the mass-recorded data, and while the main amplifier 252 is best optimized for high frequencies over a limited bandwidth, it is preferred that the auxiliary output 254 provide useful signals at a much lower frequency. Also, the preamplifier 250 is optional but, if present, it should not completely cut off signal components having frequencies below the bandwidth of the main amplifier 252. Further, in implementations including the preamplifier 250, the auxiliary amplifier 256 is optional. Moreover, while the output of the main amplifier 252 is typically digital (clipped or binary), the output of the auxiliary amplifier 256 can be analog (linear) or digital.

With further reference to FIGS. 13 and 14, another factor in detecting the auxiliary code 24 is that the reflectivity of the etched regions of the CD 22 is very much lower than that of data regions having a reflective coating on a flat surface that is interrupted by spaced pips of approximately 0.5 micron diameter. As shown in FIG. 13, the main amplifier 252 is responsive to a high first reflectivity 258 and a lower second reflectivity 260 of mass recorded data, the etched regions of the serial code 24 presenting a very much lower third reflectivity 262. Thus the main amplifier 252 can be balanced to detect a data threshold reflectivity 264 that is between the first and second reflectivities 258 and 260. Similarly, the auxiliary amplifier 256 can be balanced to detect a serial code threshold reflectivity that is between the second and third reflectivities. FIG. 14 shows in simplified form an implementation of the amplifiers 250, 252 and 256 that applies the above considerations. The main amplifier 252 in FIG. 14 has a main bandpass amplifier 268 that feeds a main comparator 270 having a data reference input D that corresponds to the data threshold reflectivity 264. Similarly, the auxiliary amplifier 256 includes an auxiliary bandpass amplifier 272 that feeds an auxiliary comparator having a serial code reference input C that corresponds to the serial code threshold reflectivity 266. It is contemplated that the bit rate of the main data is on the order of 50 times or more higher than that of the auxiliary data, thereby facilitating discrimination between signals output on the main output 244 and those output on the auxiliary output 254 using the bandpass amplifiers 268 and 272. For example, it is contemplated that with the substrate 222 moving at a velocity of 3.27 meters/sec. relative to the main read head 234, the mass recorded data has a channel bit rate of approximately 24 Mbits/sec., whereas the auxiliary data rate of the serial code 24 is approximately 164 Kbits/sec.

As further shown in FIG. 15, dimensional parameters of presently contemplated DVD disks include a substrate outside diameter DS of 120 mm, the outside radius $R_O$ of the main data region 228 being 58 mm maximum, the leadout region 226 having a maximum radius $R_L$ that is 58.5 mm maximum. A maximum "wobble" or eccentricity of recorded tracks of these DVD disks is 100 microns total, which includes 40 microns between the tracks and the locating diameter of the substrate 222, 40 microns for the disk drive 236, and 20 microns for miscellaneous contributions such as variations in locating the substrate 222 on the disk drive 236. It is further contemplated that the tracks are spaced approximately 1 micron center-to-center. Within these constraints, a preferred location of the serial code 24 is near the outside of the leadout region. In the exemplary case of the width ΔR being approximately 25 microns, the serial code 24 can be located between an inside radius R1 of approximately 58,455 microns and an outside radius R2 of approximately 58,480 microns. In one variation, the width ΔR is increased to approximately 125 microns for reliable detection without servo tracking, R1 being reduced to approximately 58,355 microns. As further shown in FIG. 15, the serial code 24 is preferably distributed in angularly spaced segments 24A, 24B, 24C, etc., with dummy data of the leadout region 226 being interspersed between the segments for enabling servo tracking of the main read head 234.

Conclusion

The system of the present invention provides the ability to shop at home by browsing through a wide variety of fully interactive multimedia catalogs, many of the items being illustrated using video, the items ordered being automatically shipped to the user's door. Also full length feature movies can be viewed on the system, the user purchasing the movie from a rental store, a small fee being billed to the user each time the movie is viewed, with the option to purchase unlimited private viewing rights.

The system of the present invention also permits playing of video games and educational multimedia applications, such as multimedia encyclopedias, either with the addition of appropriate header information or by configuring the system 10 directly play CD ROM disks that are currently available for personal computers. The system 10 can also be implemented to play open format CDs such as standard audio and video CDs as well as Kodak® Photo CDs, the photographic images being viewed on the user's home television.

Although the present invention has been described in considerable detail with reference to certain preferred versions thereof, other versions are possible. For example, the CD elements 22 can be sold with authorization for a single play or multiple plays during a single time interval, with subsequent plays or authorized time intervals being contracted for using the transaction unit 18 as described above. The authorization can be for a predetermined number of plays in an unlimited time interval. Also, the option for unlimited play may omitted or offered based on switches that are down-loaded from the TPF 40. Similarly, the duration of specific play authorizations and pricing therefor can also be altered by down-loading switches. The CD elements can be provided without the unencrypted free preview portions. Set-up and/or operation of the transaction unit 18 can be implemented with communication to the TPF 40 initiated only by the transaction interface 28 for avoiding audible rings on telephones that may be present on user premises. Further, software games can be developed specifically for the system 10, and the system 10 can include a cartridge slot for allowing the addition of electronics for the playing of games using third party standards. Moreover, correlation of vendors with user transactions can be based on numbers of copies of particular works that each vendor contributed to (by creation, production, sale). Therefore, the spirit and scope of the appended claims should not necessarily be limited to the description of the preferred versions contained herein.

What is claimed is:

1. A mass storage drive incorporating a mass storage element, the mass storage element comprising:
   (a) a substrate;
   (b) a main storage media on the substrate;
   (c) a multiplicity of main data elements stored in the main storage media, the main data elements being readable from main data tracks by data head means when the data head means moves in predetermined main path relative to the substrate; and
   (d) an auxiliary storage media on the substrate having a unique machine-readable serial identifier in a plurality of auxiliary data elements in at least one auxiliary data track wherein the auxiliary data contains at least 200 bits of information, the auxiliary data elements being readable by the data head means when the data head means moves in a predetermined auxiliary path relative to the substrate, the auxiliary path being exclusive of the main data tracks;
   (e) means for removably supporting the mass storage element;
   (f) a data head having an output for signaling the main data elements of the auxiliary data elements;
   (g) drive means for moving the substrate in a predetermined path relative to the data head for operation thereof; and
   (h) a head circuit including a main amplifier connected to the data head output and having a main output for signaling the main data elements in response to the data head, the circuit also having a separate auxiliary output for signaling the auxiliary data elements in response to the data head output.

2. The mass storage element of claim 1, wherein the main data elements are substantially read-only in character.

3. The mass storage element of claim 2, wherein the main data elements are formed by press-molding.

4. The mass storage element of claim 1, wherein the main data elements are formed by selective radiation.

5. The mass storage element of claim 1, wherein the main data elements are optically readable.

6. The mass storage element of claim 1, wherein the substrate and the main storage media are configured as a rotatable compact disk.

7. The mass storage element of claim 1, wherein the auxiliary data elements are formed by selective radiation.

8. The mass storage drive of claim 1, wherein the data head is an optical head.

9. The mass storage drive of claim 1, wherein the mass storage element is a compact disk, and the drive means comprises means for rotating the disk.

10. The mass storage element of claim 1, wherein at least a portion of the auxiliary data elements are contained in a single auxiliary data track having a plurality of auxiliary data bits of the serial identifier.

11. The mass storage element of claim 10, wherein the serial identifier contains approximately 2000 data bits.

12. The mass storage element of claim 1, wherein the main data tracks have a spacing and wherein the auxiliary data track has a width being more than double the spacing of the main data tracks.

13. The mass storage element of claim 12, wherein the width of the auxiliary data track is approximately 25 times the spacing of the main data tracks.

14. The mass storage element of claim 12, wherein the spacing of the main data tracks is approximately 1 micron and the width of the auxiliary data track is approximately 25 microns.

15. The mass storage element of claim 12, wherein the width of the auxiliary data track is at least 25 times the spacing of the main data tracks.

16. The mass storage element of claim 12, wherein the width of the auxiliary data track is between 25 microns and 125 microns.

17. The mass storage element of claim 12, wherein the width of the auxiliary data track is between 25 times and 125 times the spacing of the main data tracks.

18. The mass storage element of claim 12, wherein the spacing of the main data tracks is not more than 1 micron and the width of the auxiliary data track is not less than 25 microns.

19. The mass storage element of claim 1, including a control region extending from the main data tracks, and wherein the auxiliary data track is located within the control region.

20. The mass storage element of claim 19, and wherein the auxiliary data track is sufficiently spaced from the main data tracks for preserving functionality of the control region adjacent the main data tracks.

21. The mass storage element of claim 19, wherein the auxiliary data track is formed in sub-regions of the control region, the sub-regions being sufficiently spaced apart for preserving functionality of the control region.

22. The mass storage element of claim 19, wherein the mass storage element is a compact disk, and the control region is a leadout region having characteristic data recorded therein.

23. The mass storage drive of claim 1, the head circuit further comprising an auxiliary amplifier for driving the auxiliary output in response to the data head.

24. The mass storage drive of claim 23, the main amplifier having a first frequency response effective for passing the main data elements, the auxiliary amplifier having a second frequency response for passing the auxiliary data elements, the second frequency response substantially blocking the main data elements.

25. The mass storage drive of claim 23, the main amplifier having a first reference connection effective for balancing the main output relative to a data threshold output of the data head when the data head is reading the main data elements, the auxiliary amplifier having a second reference connection effective for balancing the auxiliary output relative to a serial code threshold output of the data head when the data head is reading the auxiliary data elements.

* * * * *